(12) United States Patent
Wang

(10) Patent No.: US 12,555,276 B2
(45) Date of Patent: Feb. 17, 2026

(54) IMAGE GENERATION METHOD AND APPARATUS

(71) Applicants: Beijing Wodong Tianjun Information Technology Co., Ltd., Beijing (CN); Beijing Jingdong Century Trading Co., Ltd., Beijing (CN)

(72) Inventor: Chenyu Wang, Beijing (CN)

(73) Assignees: Beijing Wodong Tianjun Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 367 days.

(21) Appl. No.: 18/245,081

(22) PCT Filed: May 24, 2021

(86) PCT No.: PCT/CN2021/095458
§ 371 (c)(1),
(2) Date: Mar. 13, 2023

(87) PCT Pub. No.: WO2022/052509
PCT Pub. Date: Mar. 17, 2022

(65) Prior Publication Data
US 2023/0401763 A1    Dec. 14, 2023

(30) Foreign Application Priority Data
Sep. 14, 2020    (CN) .......................... 202010958609.5

(51) Int. Cl.
*G06T 11/00*    (2006.01)
*G06T 11/60*    (2006.01)
(Continued)

(52) U.S. Cl.
CPC ............ *G06T 11/001* (2013.01); *G06T 11/60* (2013.01); *G06V 10/56* (2022.01); *G06V 10/761* (2022.01)

(58) Field of Classification Search
CPC ....... G06T 11/001; G06T 11/60; G06V 10/56; G06V 10/761
(Continued)

(56) References Cited

U.S. PATENT DOCUMENTS

2006/0214947 A1    9/2006    Boose et al.
2008/0186519 A1    8/2008    Kodama
(Continued)

FOREIGN PATENT DOCUMENTS

CN    109345612 A    2/2019
CN    111009041 A    4/2020
(Continued)

OTHER PUBLICATIONS

Adobe Systems Inc., "Adobe After Effects CS3 Professional User Guide," ADOBE, 2007, 677 pages.
(Continued)

*Primary Examiner* — Thomas J Lett
(74) *Attorney, Agent, or Firm* — Dinsmore & Shohl LLP

(57) ABSTRACT

An image generation method and apparatus. The method includes: performing image composition on the basis of an acquired image generation condition, and determining a primitive type and layout information of an image, so as to obtain a composition image (201); according to scenario construction information corresponding to the image generation condition, performing scenario construction on the composition image, and determining a primitive corresponding to each primitive type from among a plurality of primitive types in the composition image, so as to obtain a scenario construction image (202); adjusting the color of
(Continued)

each primitive in the scenario construction image according to color matching information corresponding to the image generation condition, so as to obtain a color-matched image (203); and rendering the color-matched image to obtain a target image (204).

21 Claims, 8 Drawing Sheets

(51) Int. Cl.
*G06V 10/56* (2022.01)
*G06V 10/74* (2022.01)

(58) Field of Classification Search
USPC .......................................................... 345/589
See application file for complete search history.

(56) References Cited

U.S. PATENT DOCUMENTS

| | | | | |
|---|---|---|---|---|
| 2013/0314421 | A1* | 11/2013 | Kim | ........................ G06T 19/00 |
| | | | | 345/427 |
| 2014/0292756 | A1* | 10/2014 | Mantor | ................. G06T 15/005 |
| | | | | 345/522 |
| 2017/0309027 | A1 | 10/2017 | Kleen et al. | |
| 2018/0197302 | A1 | 7/2018 | Yu | |
| 2019/0012820 | A1* | 1/2019 | Furuya | ................... H04N 1/387 |
| 2020/0184278 | A1* | 6/2020 | Zadeh | .................... G06N 3/044 |

FOREIGN PATENT DOCUMENTS

| | | |
|---|---|---|
| CN | 111061902 A | 4/2020 |
| CN | 111402364 A | 7/2020 |
| CN | 112308939 A | 2/2021 |
| JP | 0381877 A | 4/1991 |
| JP | 2009294917 A | 12/2009 |

OTHER PUBLICATIONS

Extended European Search Report mailed on Oct. 18, 2024 in corresponding European Patent Application No. 21865570.2, 9 pages.
International Search Report from PCT/CN2021/095458 mailed Aug. 23, 2021, 5 pages.

* cited by examiner

IMAGE GENERATION METHOD AND APPARATUS

This patent application is a National Stage of International Application No. PCT/CN2021/095458, filed May 24, 2021, which claims the priority from Chinese Patent Application No. 202010958609.5, filed on Sep. 14, 2020 by the applicants of Beijing Wodong Tianjun Information Technology Co., Ltd. and Beijing Jingdong Century Trading Co., Ltd. and entitled □Method and Apparatus for Generating Image, □ the disclosure of which are hereby incorporated by reference in their entireties.

FIELD

Embodiments of the present disclosure relate to the field of computer technology, and specifically to a method and apparatus for generating an image.

BACKGROUND

At present, in the field of image generation, due to the low efficiency in artificially generating images, a machine image composite engine is generally adopted to generate images.

SUMMARY

Embodiments of the present disclosure propose a method and apparatus for generating an image.

In a first aspect, an embodiment of the present disclosure provides a method for generating an image. The method includes: performing an image composition based on an acquired image generation condition, and ascertaining a primitive type and layout information of an image to obtain a composition image; performing a scene construction on the composition image according to scene construction information corresponding to the image generation condition and ascertaining a primitive corresponding to each primitive type in a plurality of primitive types in the composition image to obtain a scene construction image; adjusting a color of each primitive in the scene construction image according to color matching information corresponding to the image generation condition to obtain a color matching image; and rendering the color matching image to obtain a target image.

In some embodiments, he performing an image composition based on an acquired image generation condition, and ascertaining a primitive type and layout information of an image to obtain a composition image includes: performing, based on the acquired image generation condition, a multi-layer image composition from part to whole using a preset composition knowledge graph and ascertaining a primitive type and layout information in each layer of image to obtain a plurality of layers of composition images nested layer by layer and representing composition information of the layers, where the nested layer by layer is used to represent that, for each layer of composition image in the plurality of layers of composition images, the layer of composition image is nested with a lower layer of composition image that takes a part of primitive types in the layer of composition image as a whole.

In some embodiments, the performing, based on the acquired image generation condition, a multi-layer image composition from part to whole using a preset composition knowledge graph and ascertaining a primitive type and layout information in each layer of image to obtain a plurality of layers of composition images nested layer by layer and representing composition information of the layers includes: performing, for the each layer of composition image in the plurality of layers of composition images, following operations: ascertaining, for each composition parameter in a plurality of composition parameters ascertained based on the image generation condition and the preset knowledge graph, a parameter value of the composition parameter through determination information corresponding to the composition parameter in a composition process of the layer of composition image, where the composition parameter includes an operation parameter for each primitive type in the layer of composition image and a call parameter for the lower layer of composition image; and obtaining the layer of composition image based on each parameter value.

In some embodiments, for the layer of composition image, parameter values ascertained by a given composition parameter are different, and the layer of composition image includes a plurality of sub-composition images having identical primitive types and different layouts, and the obtaining the layer of composition image based on each parameter value includes: performing, for the each composition parameter in the plurality of composition parameters in the composition process of the layer of composition image, a nested call on a parameter value of a composition parameter having a previously ascertained parameter value, to ascertain a plurality of sets of parameter value groups including parameter values of the plurality of composition parameters; and obtaining the plurality of sub-composition images having the identical primitive types and the different layouts and corresponding to the layer of composition image, based on the plurality of sets of parameter value groups.

In some embodiments, the method further includes: ascertaining, in response to ascertaining that a selection instruction is received, at least one sub-composition image of the layer of composition image on which an upper layer of composition image of the layer of composition image is to perform a nested call, based on the selection instruction.

In some embodiments, the performing a scene construction on the composition image according to scene construction information corresponding to the image generation condition and ascertaining a primitive corresponding to each primitive type in a plurality of primitive types in the composition image to obtain a scene construction image includes: performing, for the each layer of composition image in the plurality of layers of composition images, following operations: performing a first knowledge transfer operation, until it is ascertained that a first preset termination condition is reached; ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image, where the first knowledge transfer operation includes: ascertaining a first target primitive type set corresponding to a first primitive type set based on a similarity; ascertaining scene construction information corresponding to the first target primitive type set as the target scene construction information; and ascertaining a primitive type included in the first primitive type set but not included in the first target primitive type set as a first primitive type set for the first knowledge transfer operation for next time, Where a first primitive type set for the first knowledge transfer operation for first time is a primitive type set corresponding to the layer of composition image.

In some embodiments, the ascertaining a primitive corresponding to each primitive type in a plurality of primitive types in the layer of composition image to obtain a scene construction image corresponding to the layer of composition image includes: ascertaining, from a primitive library, the primitive corresponding to the each primitive type in the plurality of primitive types in the layer of composition image according to a pre-established search tree representing a relationship between a primitive type and a primitive, to obtain the scene construction image corresponding to the layer of composition image.

In some embodiments, the first preset termination condition includes: the first primitive type set being an empty set, and a first primitive type set for the first knowledge transfer operation for this time being identical to a first primitive type set for the first knowledge transfer operation for last time. The method further includes: adding, in response to ascertaining that the first preset termination condition is that the first primitive type set for the first knowledge transfer operation for this time is identical to the first primitive type set for the first knowledge transfer operation for last time, information representing a scene construction on a primitive type in the first primitive type set for the first knowledge transfer operation for this time to the final scene construction information based on a received input instruction.

In some embodiments, the adjusting a color of each primitive in the scene construction image according to color matching information corresponding to the image generation condition to obtain a color matching image includes: performing, for each layer of scene composition image in a plurality of layers of scene composition images, following operations: performing a second knowledge transfer operation, until it is ascertained that a second preset termination condition is reached; ascertaining final color matching information corresponding to the layer of scene composition image according to target color matching information obtained through the second knowledge transfer operation for each time; and adjusting a color of each primitive in the layer of scene construction image according to the color matching information, to obtain a color matching image corresponding to the layer of scene construction image. Where the second knowledge transfer operation includes: ascertaining a second target primitive type set corresponding to a second primitive type set based on a similarity; ascertaining color matching information corresponding to the second target primitive type set as target color matching information; and ascertaining a primitive type included in the second primitive type set but not included in the second target primitive type set as a second primitive type set for the second knowledge transfer operation for next time, where a second primitive type set for the second knowledge transfer operation for first time is a primitive type set corresponding to the layer of scene composition image.

In some embodiments, the second preset termination condition includes: the second primitive type set being an empty set, and a second primitive type set for the second knowledge transfer operation for this time being identical to a second primitive type set for the second knowledge transfer operation for last time, and the method further includes: adding, in response to ascertaining that the second preset termination condition is that the second primitive type set for the second knowledge transfer operation for this time is identical to the second primitive type set for the second knowledge transfer operation for last time, information representing color matching on a primitive type in the second primitive type set for the second knowledge transfer operation for this time to the final color matching information based on a received input instruction.

In a second aspect, an embodiment of the present disclosure provides an apparatus for generating an image. The apparatus includes: a composing unit, configured to perform an image composition based on an acquired image generation condition, and ascertain a primitive type and layout information of an image to obtain a composition image; a scene constructing unit, configured to perform a scene construction on the composition image according to scene construction information corresponding to the image generation condition, and ascertain a primitive corresponding to each primitive type in a plurality of primitive types in the composition image to obtain a scene construction image; a color matching unit, configured to adjust a color of each primitive in the scene construction image according to color matching information corresponding to the image generation condition to obtain a color matching image; and a rendering unit, configured to render the color matching image to obtain a target image.

In some embodiments, the composing unit is further configured to: perform, based on the acquired image generation condition, a multi-layer image composition from part to whole using a preset composition knowledge graph, and ascertain a primitive type and layout information in each layer of image, to obtain a plurality of layers of composition images nested layer by layer and representing composition information of the layers, where the nested layer by layer is used to represent that, for each layer of composition image in the plurality of layers of composition images, the layer of composition image is nested with a lower layer of composition image that takes a part of primitive types in the layer of composition image as a whole.

In some embodiments, the composing unit is further configured to: perform, for the each layer of composition image in the plurality of layers of composition images, following operations: ascertaining, for each composition parameter in a plurality of composition parameters ascertained based on the image generation condition and the preset knowledge graph, a parameter value of the composition parameter through determination information corresponding to the composition parameter in a composition process of the layer of composition image, where the composition parameter includes an operation parameter for each primitive type in the layer of composition image and a call parameter for the lower layer of composition image; and obtaining the layer of composition image based on each parameter value.

In some embodiments, for the layer of composition image, parameter values ascertained by a given composition parameter are different, and the layer of composition image includes a plurality of sub-composition images having identical primitive types and different layouts, and the composing unit is further configured to: perform, for the each composition parameter in the plurality of composition parameters in the composition process of the layer of composition image, a nested call on a parameter value of a composition parameter having a previously ascertained parameter value, to ascertain a plurality of sets of parameter value groups including parameter values of the plurality of composition parameters; and obtaining the plurality of sub-composition images having the identical primitive types and the different layouts and corresponding to the layer of composition image, based on the plurality of sets of parameter value groups.

In some embodiments, the apparatus further includes: a selecting unit, configured to ascertain, in response to ascertaining that a selection instruction is received, at least one sub-composition image of the layer of composition image on which an upper layer of composition image of the layer of composition image is to perform a nested call, based on the selection instruction.

In some embodiments, the scene constructing unit is further configured to: perform, for the each layer of composition image in the plurality of layers of composition images, following operations: performing a first knowledge transfer operation, until it is ascertained that a first preset termination condition is reached; ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image, where the first knowledge transfer operation includes: ascertaining a first target primitive type set corresponding to a first primitive type set based on a similarity; ascertaining scene construction information corresponding to the first target primitive type set as target scene construction information; and ascertaining a primitive type included in the first primitive type set but not included in the first target primitive type set as a first primitive type set for the first knowledge transfer operation for next time, where a first primitive type set for the first knowledge transfer operation for first time is a primitive type set corresponding to the layer of composition image.

In some embodiments, the scene constructing unit is further configured to: ascertain, from a primitive library, the primitive corresponding to the each primitive type in the plurality of primitive types in the layer of composition image according to a pre-established search tree representing a relationship between a primitive type and a primitive, to obtain the scene construction image corresponding to the layer of composition image.

In some embodiments, the first preset termination condition includes: the first primitive type set being an empty set, and a first primitive type set for the first knowledge transfer operation for this time being identical to a first primitive type set for the first knowledge transfer operation for last time, and the apparatus further includes: a first adding unit, configured to: add, in response to ascertaining that the first preset termination condition is that the first primitive type set for the first knowledge transfer operation for this time is identical to the first primitive type set for the first knowledge transfer operation for last time, information representing a scene construction on a primitive type in the first primitive type set for the first knowledge transfer operation for this time to the final scene construction information based on a received input instruction.

In some embodiments, the color matching unit is further configured to: perform, for each layer of scene composition image in a plurality of layers of scene composition images, following operations: performing a second knowledge transfer operation, until it is ascertained that a second preset termination condition is reached; ascertaining final color matching information corresponding to the layer of scene composition image according to target color matching information obtained through the second knowledge transfer operation for each time; and adjusting a color of each primitive in the layer of scene construction image according to the color matching information, to obtain a color matching image corresponding to the layer of scene construction image, where the second knowledge transfer operation includes: ascertaining a second target primitive type set corresponding to a second primitive type set based on a similarity; ascertaining color matching information corresponding to the second target primitive type set as target color matching information; and ascertaining a primitive type included in the second primitive type set but not included in the second target primitive type set as a second primitive type set for the second knowledge transfer operation for next time, where a second primitive type set for the second knowledge transfer operation for first time is a primitive type set corresponding to the layer of scene composition image.

In some embodiments, the second preset termination condition includes: the second primitive type set being an empty set, and a second primitive type set for the second knowledge transfer operation for this time being identical to a second primitive type set for the second knowledge transfer operation for last time, and the apparatus further includes: a second adding unit, configured to: add, in response to ascertaining that the second preset termination condition is that the second primitive type set for the second knowledge transfer operation for this time is identical to the second primitive type set for the second knowledge transfer operation for last time, information representing color matching on a primitive type in the second primitive type set for the second knowledge transfer operation for this time to the final color matching information based on a received input instruction.

In a third aspect, an embodiment of the present disclosure provides a computer readable medium, storing a computer program. The program, when executed by a processor, implements the method according to according to any implementation in the first aspect.

In a fourth aspect, an embodiment of the present disclosure provides an electronic device, including: one or more processors; and a storage apparatus, configured to store one or more programs. The one or more programs, when executed by the one or more processors, cause the one or more processors to implement the method according to any implementation in the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
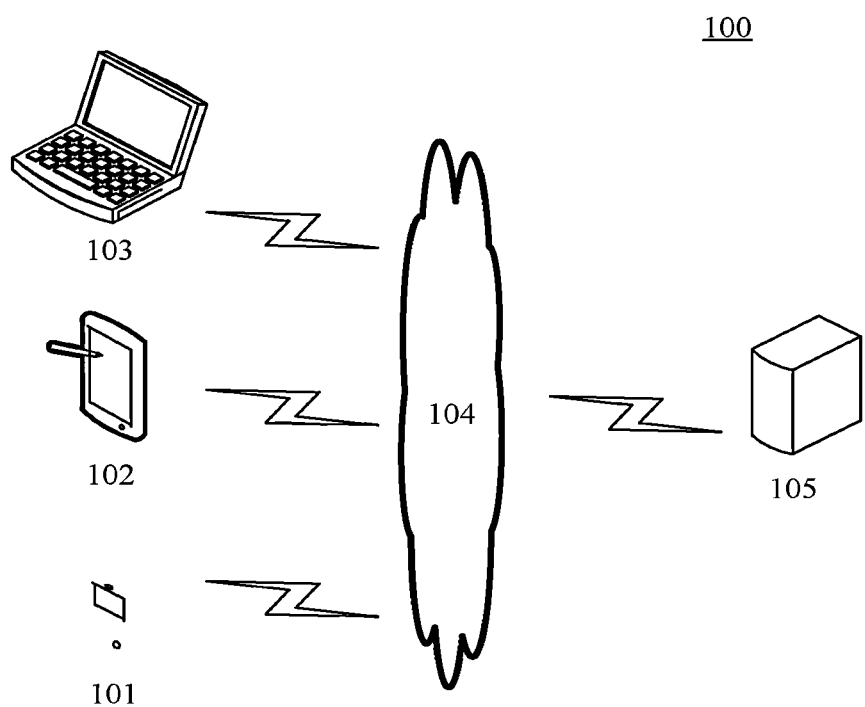
FIG. 1 is a diagram of an exemplary system architecture in which an embodiment of the present disclosure may be applied.

FIG. 1 illustrates an exemplary system architecture 100 in which a method and apparatus for generating an image according to the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 may be hardware devices or software that supports a network connection to perform data interaction and data processing. When being hardware, the terminal devices 101, 102 and 103 may be various electronic devices supporting a network connection function, an information interaction function, an information display function, an information processing function, etc. The electronic devices include, but not limited to, a smartphone, a tablet computer, an e-book reader, a laptop portable computer, a desktop computer, etc. When being the software, the terminal devices 101, 102 and 103 may be installed in the above listed electronic devices. For example, the terminal devices may be implemented as a plurality of pieces of software or a plurality of software modules that are used to provide a distributed service, or as a single piece of software or a single software module, which will not be specifically limited here.

The server 105 may be a server providing various services. For example, the server 105 may be a backend processing server that performs an image generation in response to ascertaining an image generation condition inputted by a user at the terminal devices 101, 102 and 103. The backend processing server may perform a composition, a scene construction, color matching, rendering and other processing based on the image generation condition, thus obtaining a target image. Alternatively, the backend processing server may feed back the target image to the terminal devices for display by the terminal devices. As an example, the server 105 may be a cloud server.

It should be noted that the server 105 may be hardware or software. When being the hardware, the server 105 may be implemented as a distributed server cluster composed of a plurality of servers, or as a single server. When being the software, the server 105 may be implemented as a plurality of pieces of software or a plurality of software modules (e.g., software or software modules for providing a distributed service), or as a single piece of software or a single software module, which will not be specifically limited here.

It should also be noted that the method for generating an image provided in the embodiments of the present disclosure may be performed by the server, may be performed by the terminal devices, or may be performed by the server and terminal devices in cooperation with each other. Correspondingly, the parts (e.g., units, sub-units, modules and sub-modules) included in the apparatus for generating an image may be all provided in the server, may be all provided in the terminal devices, or may be respectively provided in the server and the terminal devices.

It should be appreciated that the numbers of the terminal devices, the networks and the servers in FIG. 1 are merely illustrative. Any number of terminal devices, networks and servers may be provided based on actual requirements. When an electronic device on which the method for generating an image runs does not require a data transmission with other electronic devices, the system architecture may include only the electronic device (e.g., the server or the terminal devices) on which the method for generating an image runs.

Figure 2:
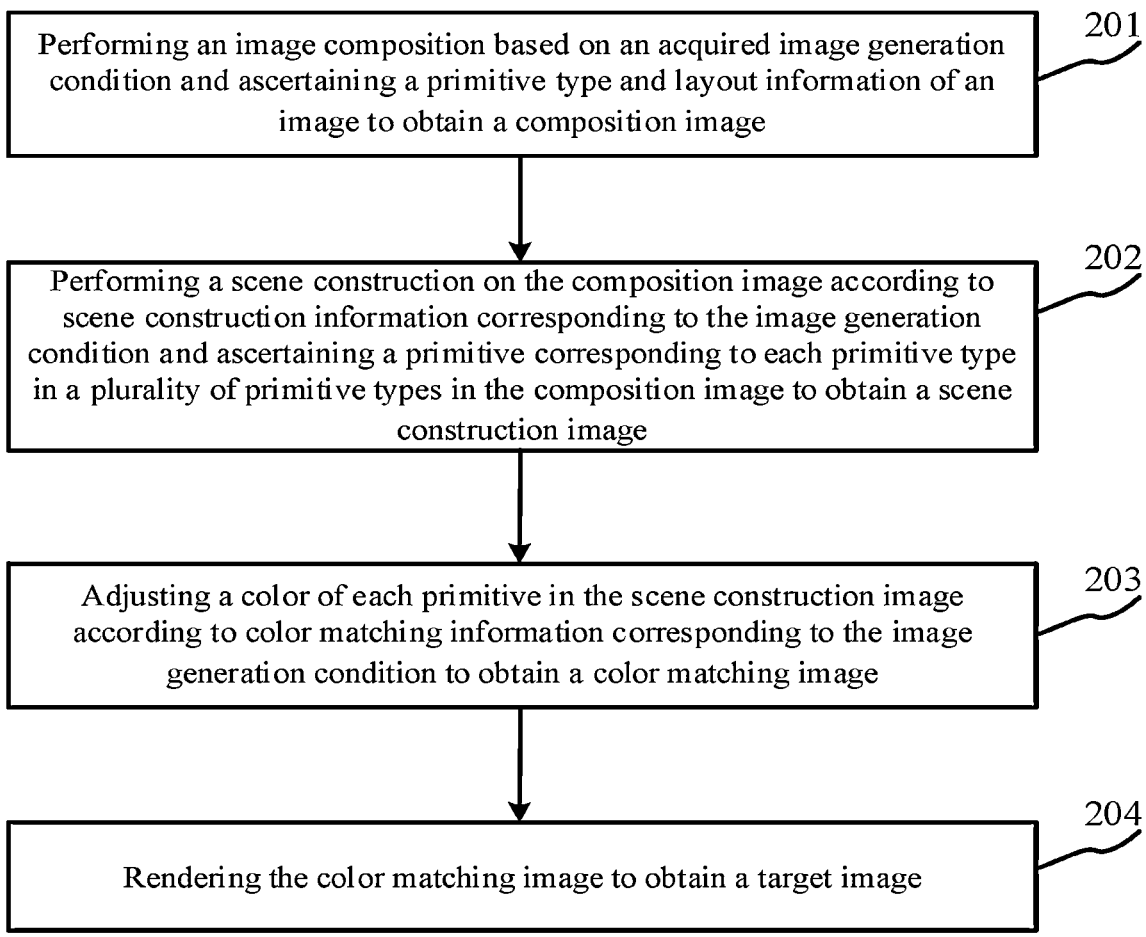
FIG. 2 is a flowchart of an embodiment of a method for generating an image according to the present disclosure.

Further referring to FIG. 2, FIG. 2 illustrates a flow 200 of an embodiment of a method for generating an image, including the following steps.

Step 201, performing an image composition based on an acquired image generation condition, and ascertaining a primitive type and layout information of an image to obtain a composition image.

In this embodiment, an executing body (e.g., the terminal devices or server shown in FIG. 1) of the method for generating an image may acquire the image generation condition, perform the image composition based on the acquired image generation condition, and ascertain the primitive type and layout information of the image to obtain the composition image.

Here, the image generation condition represents a restriction condition of a generated image, which includes at least one of: an image theme, an image size, an image style, or image copywriting content.

A primitive generally refers to a basic graphic element constituting an image, and the composition process of the image is a process of ascertaining a primitive type in a generated image and layout information of the primitive type. The primitive type may be obtained by classifying one or more attributes of various primitives included in the image. As an example, according to the position information of a primitive in the image, the primitive may be divided into primitive types such as an upper primitive, a lower primitive, a left primitive, and a right primitive. According to the category of the primitive, the primitive may be divided into primitive types such as a background primitive, a graphic primitive, and a text primitive.

It should be noted that the primitive type in this embodiment may be a coarse-grained or fine-grained primitive type that is flexibly divided according to actual situations.

According to the image generation condition, the above executing body may search a preset composition knowledge graph for corresponding composition information. Here, the preset composition knowledge graph includes knowledge of corresponding relationships between various image generation conditions and composition information. As an example, if the image generation condition refers to an annual carnival theme, the above executing body may ascertain a corresponding primitive type and corresponding layout information from the composition information related to an annual carnival. For example, it is ascertained that the background of the image to be generated is a background showing a lively and joyful atmosphere.

In some alternative implementations of this embodiment, in order to obtain a more detailed composition image, the above executing body may perform the above step 201 by: performing, based on the acquired image generation condition, a multi-layer image composition from part to whole using a preset composition knowledge graph, and ascertaining a primitive type and layout information in each layer of image, to obtain a plurality of layers of composition images nested layer by layer and representing composition information of the layers. Here, the nested layer by layer is used to represent that, for each layer of composition image in the plurality of layers of composition images, the layer of composition image is nested with a lower layer of composition image that takes a part of primitive types in the layer of composition image as a whole.

According to the image generation condition, the above executing body first ascertains a part of primitive types and layout information in the image to obtain a composition image corresponding to this part. Based on a nested call on the layer of composition image, new primitive types are gradually added, and the layout information of the layer of composition image and the newly added primitive types is ascertained, thus ascertaining the lower layer of composition image. Accordingly, the above executing body finally obtains a complete composition image.

As an example, the above executing body may first ascertain a first layer of composition image, including two primitive types (i.e., background and text content) and the layout information of the two primitive types. On the basis of the first layer of composition image, a new primitive type—an inserted picture is ascertained, and the layout information of the first layer of composition image and the newly inserted picture is ascertained, thus obtaining a second layer of composition image. On the basis of the second layer of composition image, a new primitive type-a retouching graphic is continuously ascertained, and the layout information of the second layer of composition image and the newly inserted retouching graphic is ascertained, thus obtaining a final composition image.

Further, in these implementations, for the each layer of composition image in the plurality of layers of composition images, the executing body performs the following operations:

First, in the composition process of the layer of composition image, for each composition parameter in a plurality of composition parameters ascertained based on the image generation condition and the preset knowledge graph, a parameter value of the composition parameter is ascertained through the determination information corresponding to the composition parameter. Here, the composition parameter includes an operation parameter for each primitive type in the layer of composition image and a call parameter for the lower layer of composition image.

As an example, the composition parameter may be a parameter representing an ascertainment for a lateral or longitudinal arrangement according to the size of the image, or a parameter representing an ascertainment for an arrangement around an inserted picture or on one side of the picture according to the inserted picture. The determination information can represent a comparison result of the length and the width of the image, such that it can be ascertained that the inserted text is arranged longitudinally when the length of the image to be generated is greater than the width; otherwise, the inserted text may be arranged laterally.

Then, the layer of composition image is obtained based on each parameter value.

The parameter value of each parameter is ascertained based on the ascertainment of the primitive type, and accordingly, the layer of composition image is ascertained.

Figure 3:
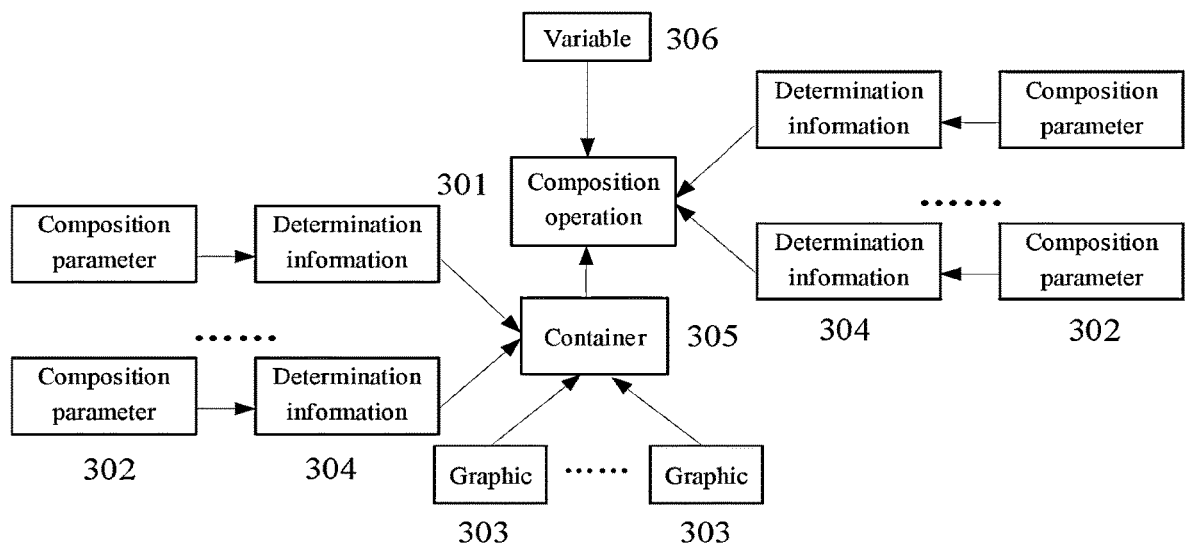
FIG. 3 is a schematic diagram of obtaining a composition image according to a plurality of operations of the present disclosure.

In this embodiment, as shown in FIG. 3, the above executing body may gradually implement the composition process of the layer of composition image in units of a composition operation 301. Here, the composition operation may be any operation involved in the composition process. As an example, the composition operation may be an alignment operation for different primitive types in the layer of composition image. Each composition operation includes a corresponding composition parameter 302 and a corresponding composition object 303. Here, the composition object includes a lower layer of composition image and a newly added primitive type. Through the determination information 304 corresponding to each composition parameter, the specific parameter value of the composition parameter is ascertained.

Each composition object in the composition image can be regarded as one graphic constituting the composition image. Various graphics are stored in a corresponding container 305. The selection and storage of the container for the lower layer of composition image are a nested call for the lower layer of composition image. For the container storing the composition object of the layer of composition image, a corresponding composition parameter representing a nested call for the lower layer of composition image may be further provided, to implement the nested call on the lower layer of composition image.

It may appreciated that the nested call of an upper layer of composition image for the layer of composition image will affect the composition process of the layer of composition image. Therefore, each composition operation in the composition process of the layer of composition image needs to be affected by the upper layer of composition image. In FIG. 3, the effect of the upper layer of composition image on the composition operation is reflected through a variable 306.

For the each composition operation in the composition process, the corresponding composition parameter and the corresponding composition object are ascertained. Here, the composition object includes the lower layer of composition image, thereby implementing a composition process in which images are nested layer by layer from part to whole.

In this embodiment, category information for the composition operation is preset in the above executing body. The classification information of the composition operation may be fine-grained or coarse-grained category information divided according to actual situations. The above executing body may ascertain a composition operation of a corresponding category based on a received classification information selection operation, and an image composition is performed according to the ascertained composition operation of the category.

It may be appreciated that, for one layer of composition image, the parameter values ascertained by the same composition parameter may be different. That is, there is a kind of parameter in a plurality of parameters of the layer of composition image: the corresponding different parameter values under this parameter all satisfy the image generation condition of the layer of composition image and the knowledge in a preset composition knowledge library. Accordingly, the layer of composition image will include a plurality of sub-composition images having identical primitive types and different layouts.

For the situation where the parameter values ascertained by the same composition parameter may be different, first, the above executing body performs, for the each composition parameter in the plurality of composition parameters in the composition process of the layer of composition image, a nested call on a parameter value of a composition parameter having a previously ascertained parameter value, to ascertain a plurality of sets of parameter value groups including parameter values of the plurality of composition parameters. For the only composition parameter having an ascertained parameter value, the parameter values between the plurality of sets of parameter value groups are the same. For the same composition parameter for which different parameter values are selected, the parameter values between the plurality of sets of parameter value groups are different.

Figure 4:
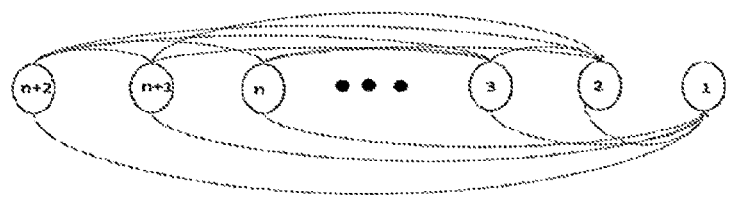
FIG. 4 is a schematic diagram of a nested call for a parameter in a composition process according to the present disclosure.

As shown in FIG. 4, the layer of composition image includes N+2 parameter nodes, and each parameter node corresponds to one parameter. The second parameter node may perform a nested call on the first parameter node. Similarly, the (N+2)th parameter node may perform a nested call on the N+1 parameter nodes before the (N+2)th parameter node, thus finally ascertaining a parameter value array.

Then, based on the plurality of sets of parameter value groups, the above executing body obtains the plurality of sub-composition images having the identical primitive types and the different layouts and corresponding to the layer of composition image. In the composition process of an upper layer of image, any sub-composition image in a lower layer of image may be called, thereby increasing the richness of the composition image.

In some alternative implementations of this embodiment, in response to ascertaining that a selection instruction is received, the above executing body ascertains at least one sub-composition image of the layer of composition image on which an upper layer of composition image of the layer of composition image is to perform a nested call, based on the selection instruction.

Figure 5:
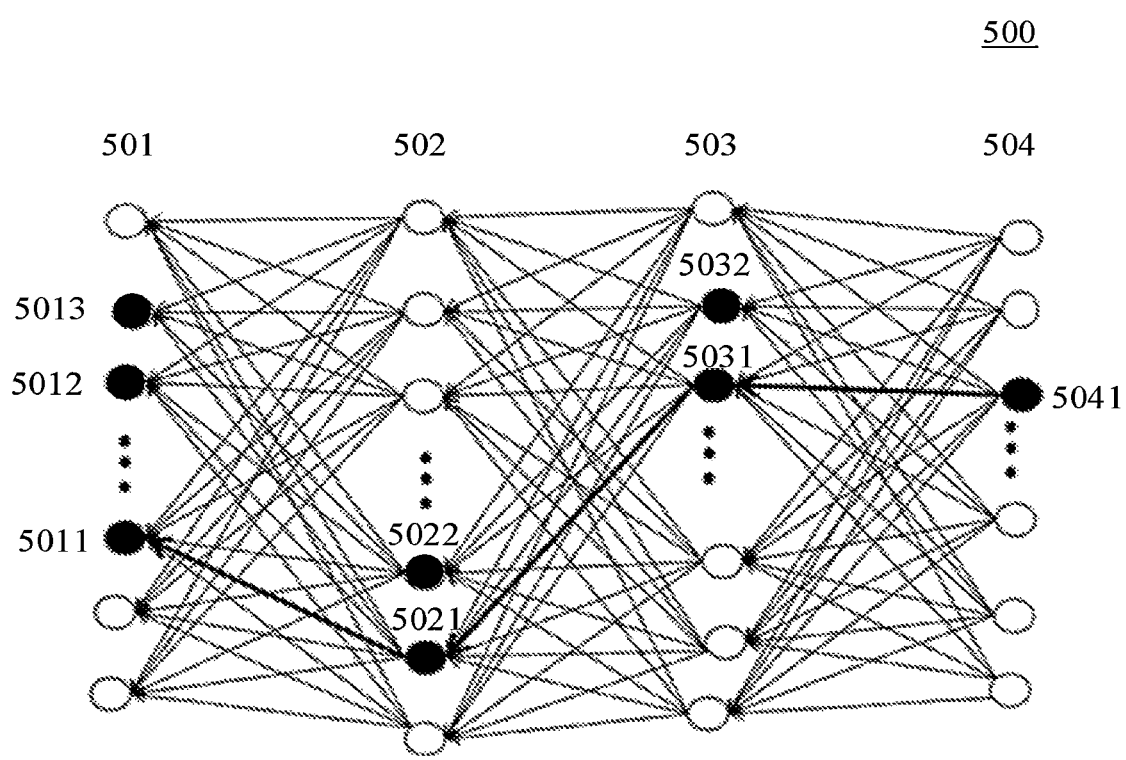
FIG. 5 is a schematic diagram of a composition operation according to an embodiment of the present disclosure.

As shown in FIG. 5, FIG. 5 is a schematic diagram 500 of a selection control logic in a composition process according to an embodiment of the present disclosure. Here, the composition process involves a first layer of composition image 501, a second layer of composition image 502, a third layer of composition image 503, and a fourth layer of composition image 504. Specifically, each layer of composition image includes a plurality of sub-composition images, and the each layer of composition image performs a nested call on a lower layer of composition image, thus finally obtaining the fourth layer of composition image.

Here, a sub-composition image in each layer of composition image may be considered as a node. Based on a selection instruction received in the composition process, the above executing body ascertains sub-composition images 5011, 5012 and 5013 in the first layer of composition image 501, sub-composition images 5021 and 5022 in the second layer of composition image 502, sub-composition images 5031 and 5032 in the third layer of composition image 503, and a sub-composition image 5041 in the fourth layer of composition image 504. Based on the nodes corresponding to the ascertained sub-composition images in the layers of composition images, the above executing body can ascertain the composition path of the top-most layer of composition image in the composition process, for example, the composition image corresponding to the composition path designated by the sub-composition images 5011, 5021, 5031 and 5041.

Step 202, performing a scene construction on the composition image according to scene construction information corresponding to the image generation condition and ascertaining a primitive corresponding to each primitive type in a plurality of primitive types in the composition image to obtain a scene construction image.

In this embodiment, the above executing body may perform the scene construction on the composition image obtained in step 201 according to the scene construction information corresponding to the image generation condition, and ascertain the primitive corresponding to the each primitive type in the plurality of primitive types in the composition image, to obtain the scene construction image.

Here, the scene construction process of the composition image is a process of ascertaining a primitive corresponding to a primitive type in the composition image, which likely involves an adjustment for the position information of the primitive.

As an example, the scene construction information may be a scene construction script ascertained according to a scene construction knowledge library including corresponding scene construction knowledge under various image generation conditions. The primitive corresponding to the each primitive type in the plurality of primitive types in the composition image may be ascertained from a primitive library according to the scene construction information.

In this embodiment, in order to improve the practicability of the primitive library, the primitive library is required to include rich primitives. In addition to acquiring existing primitives through a third party and designing primitives autonomously, the above executing body may perform a primitive combination based on the atomic primitives (indecomposable primitives) of the third party and the autonomously designed primitives, to generate a composite primitive.

Figure 6:
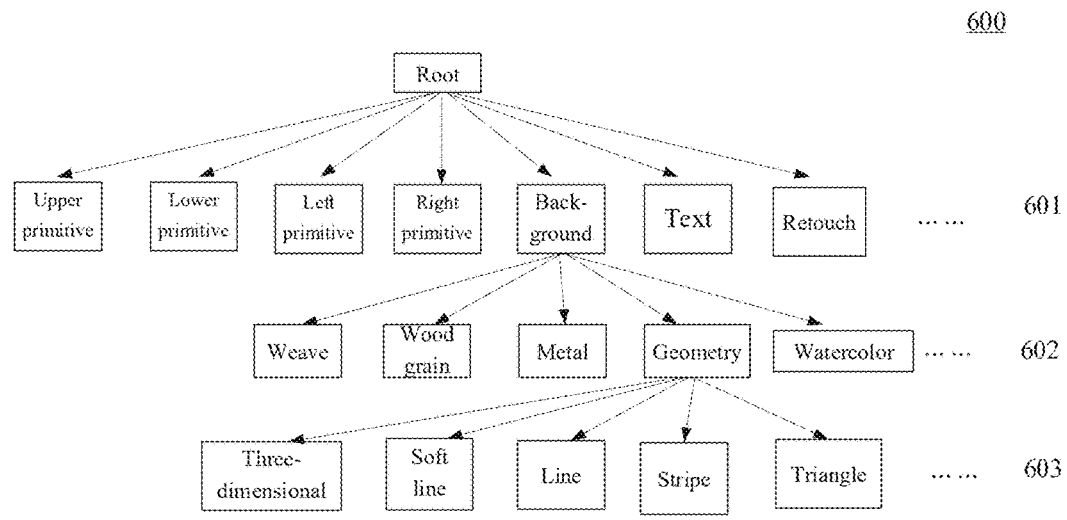
FIG. 6 is a schematic diagram of a search tree according to the present disclosure.

There are a large number of various primitives in the primitive library. In order to improve the efficiency of ascertaining a primitive, a search tree representing a corresponding relationship between a primitive type and a primitive is established in advance. As shown in FIG. 6, FIG. 6 is a schematic diagram of a search tree. The search tree 600 includes coarse-grained primitive types 601. For the coarse-grained primitive types 601, a further division is performed to obtain fine-grained primitive types 602. Each fine-grained primitive type 602 includes a corresponding primitive 603 and records specific primitive information.

The above executing body can quickly ascertain the primitive corresponding to the each primitive type in the plurality of primitive types in the layer of composition image from the primitive library according to the search tree, thus obtaining the scene construction image corresponding to the layer of composition image.

In some alternative implementations of this embodiment, only a few pieces of frequently used and typical scene construction information may be created. On the basis of the existing scene construction information, the above executing body ascertains the scene construction information required in a scene construction process through a knowledge transfer.

Specifically, for the each layer of composition image in the plurality of layers of composition images, the above executing body performs the following operations.

First, a first knowledge transfer operation is performed as follows, until it is ascertained that a first preset termination condition is reached.

Firstly, a first target primitive type set corresponding to a first primitive type set is ascertained based on a similarity.

Here, the first target primitive type set is a set having a maximum similarity to the first primitive type set. As an example, the more the primitive types in the intersection between sets are, the higher the similarity is.

Secondly, scene construction information corresponding to the first target primitive type set is ascertained as target scene construction information.

Thirdly, a primitive type included in the first primitive type set but not included in the first target primitive type set is ascertained as a first primitive type set for the first knowledge transfer operation for next time.

In these implementations, for the each layer of composition image, the above executing body may perform the first knowledge transfer operation many times. Here, a first primitive type set for the first knowledge transfer operation for first time is a primitive type set corresponding to the layer of composition image. The primitive type set corresponding to the layer of composition image is a set consisting of all the primitive types included in the layer of composition image.

Then, final scene construction information corresponding to the layer of composition image is ascertained according to target scene construction information obtained through the first knowledge transfer operation for each time.

As an example, the target scene construction information obtained through the first knowledge transfer operation for each time may be combined to obtain the final scene construction information.

Finally, a scene construction is performed on the layer of composition image according to the final scene construction information, and a primitive corresponding to each primitive type in a plurality of primitive types in the layer of composition image is ascertained, to obtain a scene construction image corresponding to the layer of composition image.

In the first knowledge transfer operation, the first preset termination condition includes: the first primitive type set being an empty set, and a first primitive type set for the first knowledge transfer operation for this time being identical to a first primitive type set for the first knowledge transfer operation for last time.

When the first preset termination condition is that the first primitive type set for the first knowledge transfer operation for this time is identical to the first primitive type set for the first knowledge transfer operation for last time, it indicates that the primitive type set corresponding to the layer of composition image includes a primitive type not yet involved, and it is required to add corresponding scene construction information based on an input operation of the user.

Specifically, in response to ascertaining that the first preset termination condition is that the first primitive type set for the first knowledge transfer operation for this time is identical to the first primitive type set for the first knowledge transfer operation for last time, the above executing body adds information representing a scene construction on a primitive type in the first primitive type set for the first knowledge transfer operation for this time to the final scene construction information based on a received input instruction.

Step 203, adjusting a color of each primitive in the scene construction image according to color matching information corresponding to the image generation condition to obtain a color matching image.

In this embodiment, according to the color matching information corresponding to the image generation condition, the above executing body can adjust the color of the each primitive in the scene construction image obtained in step 202, to obtain the color matching image.

The color matching information may be a color matching script ascertained according to a color matching knowledge library including corresponding color matching knowledge under various image generation conditions. The primitive corresponding to the each primitive type in the plurality of primitive types in the composition image may be ascertained from the primitive library according to the color matching information.

Taking a composition image including a background, a picture, a text and a heap graph as an example, the following operations may be performed according to corresponding color matching information. First, the color of the background is ascertained. For example, the color of the background is ascertained according to an uploaded picture. Specifically, the color of the background may be a maximum color component, a complementary color or an adjacent color of the uploaded picture. As another example, the color of the background may be randomly acquired from a color set corresponding to the theme defined in the image generation condition. Then, the color of the text is ascertained. The color of the text is the same as the color of the background, and on this basis, the brightness thereof is modified. Alternatively, color matching is performed through a preset color matching table, and then, color matching is performed on the shadow of the text. The matched color of the shadow of the text is the same as the color of the text, and on this basis the brightness is modified. Finally, a hue transfer is performed on the heap graph, to make the heap graph have the same color as the background.

In some alternative implementations of this embodiment, only a few pieces of frequently used and typical color matching information may be created. On the basis of the existing color matching information, the above executing body ascertains the color matching information required in a color matching process through a knowledge transfer.

Specifically, for each layer of scene composition image in a plurality of layers of scene composition images, the following operations are performed.

First, a second knowledge transfer operation is performed as follows, until it is ascertained that a second preset termination condition is reached.

Firstly, a second target primitive type set corresponding to a second primitive type set is ascertained based on a similarity.

Here, the second target primitive type set is a set having a maximum similarity to the second primitive type set. As an example, the more the primitive types in the intersection between sets are, the higher the similarity is.

Secondly, color matching information corresponding to the second target primitive type set is ascertained as target color matching information.

Thirdly, a primitive type included in the second primitive type set but not included in the second target primitive type set is ascertained as a second primitive type set for the second knowledge transfer operation for next time.

In these implementations, for the each layer of scene composition image, the above executing body may perform the second knowledge transfer operation many times. Here, a second primitive type set for the second knowledge transfer operation for first time is a primitive type set corresponding to the layer of scene composition image.

Then, final color matching information corresponding to the layer of scene composition image is ascertained according to target color matching information obtained through the second knowledge transfer operation for each time.

As an example, the target scene construction information obtained through the second knowledge transfer operation for each time may be combined to obtain the final scene construction information.

Finally, a color of each primitive in the layer of scene construction image is adjusted according to the color matching information, to obtain a color matching image corresponding to the layer of scene construction image.

In the second knowledge transfer operation, the second preset termination condition includes: the second primitive type set being an empty set, and a second primitive type set for the second knowledge transfer operation for this time being identical to a second primitive type set for the second knowledge transfer operation for last time.

When the second preset termination condition is the second primitive type set for the second knowledge transfer operation for this time being identical to the second primitive type set for the second knowledge transfer operation for last time, it indicates that the primitive type set corresponding to the layer of scene construction image includes a primitive type not yet involved, and it is required to add corresponding color matching information based on an input operation of the user.

Specifically, in response to ascertaining that the second preset termination condition is the second primitive type set for the second knowledge transfer operation for this time being identical to the second primitive type set for the second knowledge transfer operation for last time, the above executing body adds information representing color matching on a primitive type in the second primitive type set for the second knowledge transfer operation for this time to the final color matching information based on a received input instruction.

Step 204, rendering the color matching image to obtain a target image.

In this embodiment, the above executing body may render the color matching image obtained in step 203, to obtain the target image.

The task to be accomplished during the rendering of the image is to generate an image through a geometric transformation, a projection transformation, a perspective transformation and window cropping, and then through acquired material and shadow information.

Figure 7:
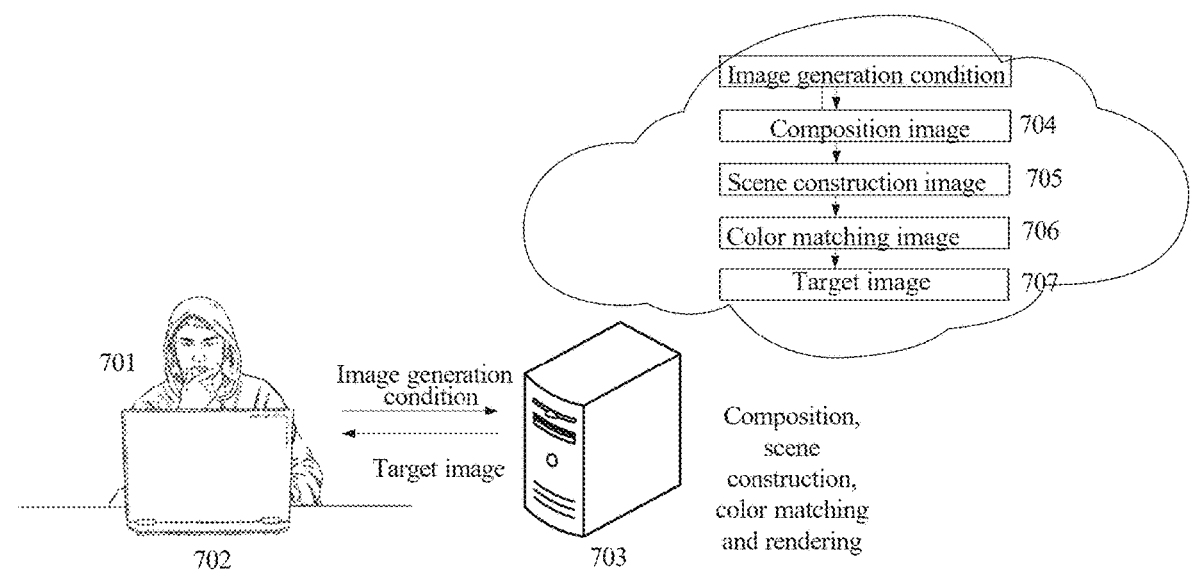
FIG. 7 is a schematic diagram of an application scenario of the method for generating an image according to this embodiment.

Further referring to FIG. 7, FIG. 7 is a schematic diagram of an application scenario of the method for generating an image according to this embodiment. In the application scenario of FIG. 7, a user 701 inputs an image generation condition through a terminal device 702. A server 703 performs an image composition based on the acquired image generation condition, and ascertains a primitive type and layout information of an image to obtain a composition image 704. The server 703 performs a scene construction on the composition image 704 according to scene construction information corresponding to the image generation condition, and ascertains a primitive corresponding to each primitive type in a plurality of primitive types in the composition image 704, to obtain a scene construction image 705. The server 703 adjusts a color of each primitive in the scene construction image according to color matching information corresponding to the image generation condition, to obtain a color matching image 706. The server 703 renders the color matching image to obtain a target image 707, and feeds back the target image 707 to the terminal device 702.

According to the method provided in the above embodiment of the present disclosure, the image composition is performed based on the acquired image generation condition, and the primitive type and layout information of the image are ascertained to obtain the composition image. The scene construction is performed on the composition image according to the scene construction information corresponding to the image generation condition, and the primitive corresponding to the each primitive type in the plurality of primitive types in the composition image is ascertained to obtain the scene construction image. The color of the each primitive in the scene construction image is adjusted according to the color matching information corresponding to the image generation condition to obtain the color matching image. The color matching image is rendered to obtain the target image. Therefore, the target image can be flexibly generated according to the image generation condition, thereby improving the flexibility in generating an image.

Figure 8:
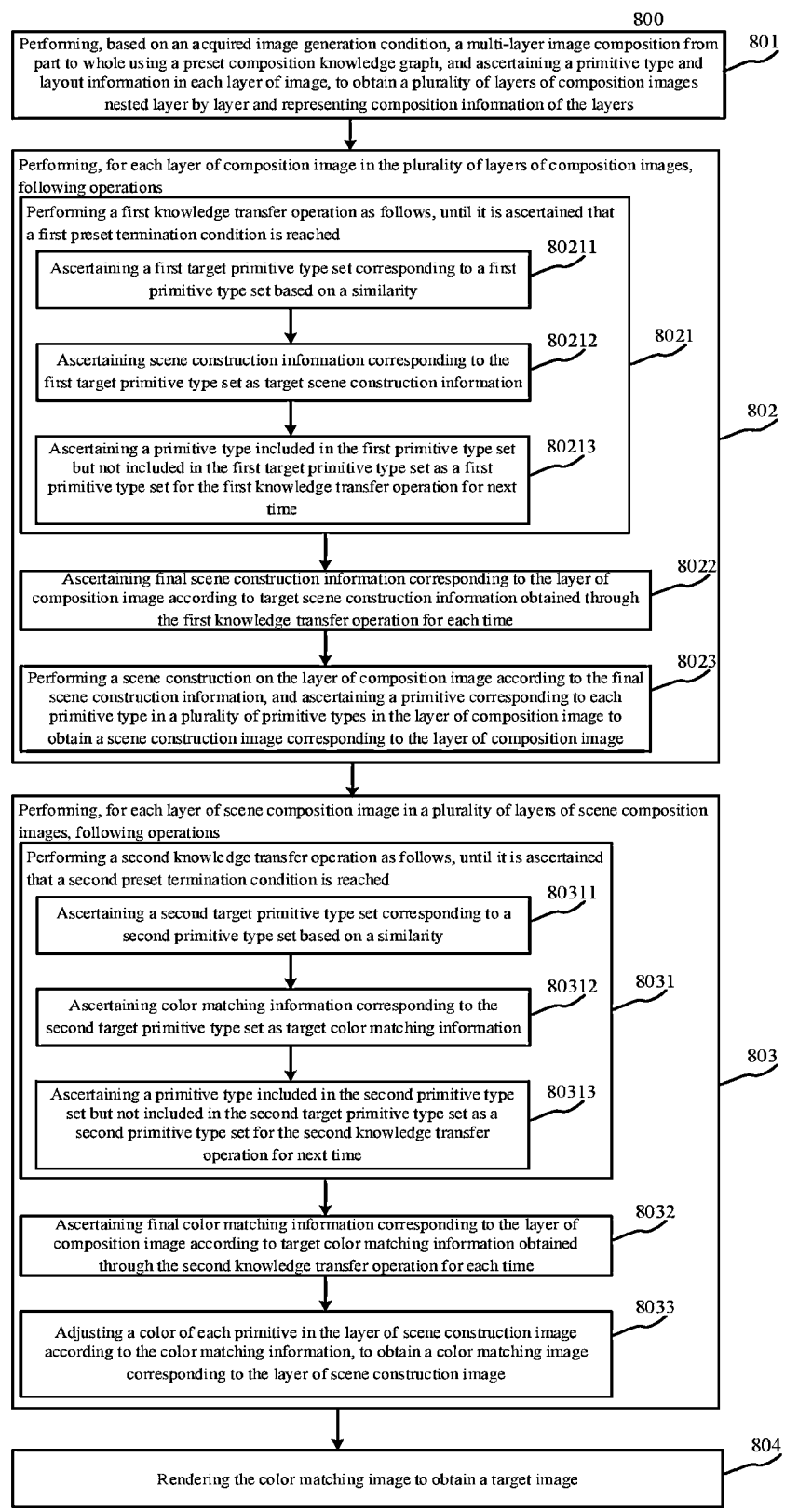
FIG. 8 is a flowchart of another embodiment of the method for generating an image according to the present disclosure.

Further referring to FIG. 8, FIG. 8 illustrates a flow 800 of another embodiment of the method for generating an image according to the present disclosure, including the following steps.

Step 801, performing, based on an acquired image generation condition, a multi-layer image composition from part to whole using a preset composition knowledge graph, and ascertaining a primitive type and layout information in each layer of image, to obtain a plurality of layers of composition images nested layer by layer and representing composition information of the layers.

Step 802, performing, for each layer of composition image in the plurality of layers of composition images, following operations.

Step 8021, performing a first knowledge transfer operation as follows, until it is ascertained that a first preset termination condition is reached:

Step 80211, ascertaining a first target primitive type set corresponding to a first primitive type set based on a similarity.

Step 80212, ascertaining scene construction information corresponding to the first target primitive type set as target scene construction information.

Step 80213, ascertaining a primitive type included in the first primitive type set but not included in the first target primitive type set as a first primitive type set for the first knowledge transfer operation for next time, where a first primitive type set for the first knowledge transfer operation for first time is a primitive type set corresponding to the layer of composition image.

Step 8022, ascertaining final scene construction information corresponding to the layer of composition image according to target scene construction information obtained through the first knowledge transfer operation for each time.

Step 8023, performing a scene construction on the layer of composition image according to the final scene construction information, and ascertaining a primitive corresponding to each primitive type in a plurality of primitive types in the layer of composition image to obtain a scene construction image corresponding to the layer of composition image.

Step 803, performing, for each layer of scene composition image in a plurality of layers of scene composition images, following operations.

Step 8031, performing a second knowledge transfer operation as follows, until it is ascertained that a second preset termination condition is reached.

Step 80311, ascertaining a second target primitive type set corresponding to a second primitive type set based on a similarity.

Step 80312, ascertaining color matching information corresponding to the second target primitive type set as target color matching information.

Step 80313, ascertaining a primitive type included in the second primitive type set but not included in the second target primitive type set as a second primitive type set for the second knowledge transfer operation for next time.

Here, a second primitive type set for the second knowledge transfer operation for first time is a primitive type set corresponding to the layer of scene composition image.

Step 8032, ascertaining final color matching information corresponding to the layer of scene composition image according to target color matching information obtained through the second knowledge transfer operation for each time.

Step 8033, adjusting a color of each primitive in the layer of scene construction image according to the color matching information, to obtain a color matching image corresponding to the layer of scene construction image.

Step 804, rendering the color matching image to obtain a target image.

It can be seen from this embodiment that, as compared with the embodiment corresponding to FIG. 2, the flow 800 of the method for generating an image in this embodiment specifically illustrates the process of performing a composition by layers, and the knowledge transfer processes in the scene construction process and the color matching process. Thus, the quality and efficiency of generating the image in this embodiment are improved.

Figure 9:
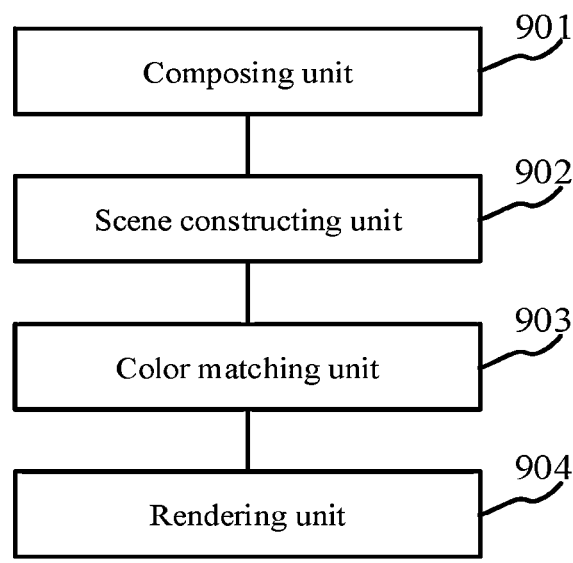
FIG. 9 is a structural diagram of an embodiment of an apparatus for generating an image according to the present disclosure.

Further referring to FIG. 9, as an implementation of the method shown in the above drawings, the present disclosure provides an embodiment of an apparatus for generating an image. The embodiment of the apparatus corresponds to the embodiment of the method shown in FIG. 2. The apparatus may be applied in various electronic devices.

As shown in FIG. 9, the apparatus for generating an image includes: a composing unit 901, configured to perform an image composition based on an acquired image generation condition, and ascertain a primitive type and layout information of an image to obtain a composition image; a scene constructing unit 902, configured to perform a scene construction on the composition image according to scene construction information corresponding to the image generation condition, and ascertain a primitive corresponding to each primitive type in a plurality of primitive types in the composition image to obtain a scene construction image; a color matching unit 903, configured to adjust a color of each primitive in the scene construction image according to color matching information corresponding to the image generation condition to obtain a color matching image; and a rendering unit 904, configured to render the color matching image to obtain a target image.

In some embodiments, the composing unit 901 is further configured to: perform, based on the acquired image generation condition, a multi-layer image composition from part to whole using a preset composition knowledge graph, and ascertain a primitive type and layout information in each layer of image, to obtain a plurality of layers of composition images nested layer by layer and representing composition information of the layers, where the nested layer by layer is used to represent that, for each layer of composition image in the plurality of layers of composition images, the layer of composition image is nested with a lower layer of composition image that takes a part of primitive types in the layer of composition image as a whole.

In some embodiments, the composing unit 901 is further configured to: perform, for the each layer of composition image in the plurality of layers of composition images, following operations: ascertaining, for each composition parameter in a plurality of composition parameters ascertained based on the image generation condition and the preset knowledge graph, a parameter value of the composition parameter through determination information corresponding to the composition parameter in a composition process of the layer of composition image, where the composition parameter includes an operation parameter for each primitive type in the layer of composition image and a call parameter for the lower layer of composition image; and obtaining the layer of composition image based on each parameter value.

In some embodiments, for the layer of composition image, parameter values ascertained by a given composition parameter are different, and the layer of composition image includes a plurality of sub-composition images having identical primitive types and different layouts. The composing unit 901 is further configured to: perform, for the each composition parameter in the plurality of composition parameters in the composition process of the layer of composition image, a nested call on a parameter value of a composition parameter having a previously ascertained parameter value, to ascertain a plurality of sets of parameter value groups including parameter values of the plurality of composition parameters; and obtaining the plurality of sub-composition images having the identical primitive types and the different layouts and corresponding to the layer of composition image, based on the plurality of sets of parameter value groups.

In some embodiments, the apparatus further includes: a selecting unit (not shown), configured to ascertain, in response to ascertaining that a selection instruction is received, at least one sub-composition image of the layer of composition image on which an upper layer of composition image of the layer of composition image is to perform a nested call, based on the selection instruction.

In some embodiments, the scene constructing unit 902 is further configured to: perform, for the each layer of composition image in the plurality of layers of composition images, following operations: performing a first knowledge transfer operation, until it is ascertained that a first preset termination condition is reached; ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image. Here, the first knowledge transfer operation includes: ascertaining a first target primitive type set corresponding to a first primitive type set based on a similarity; ascertaining scene construction information corresponding to the first target primitive type set as target scene construction information; and ascertaining a primitive type included in the first primitive type set but not included in the first target primitive type set as a first primitive type set for the first knowledge transfer operation for next time. Here, a first primitive type set for the first knowledge transfer operation for first time is a primitive type set corresponding to the layer of composition image.

In some embodiments, the scene constructing unit 902 is further configured to: ascertain, from a primitive library, the primitive corresponding to the each primitive type in the plurality of primitive types in the layer of composition image according to a pre-established search tree representing a relationship between a primitive type and a primitive, to obtain the scene construction image corresponding to the layer of composition image.

In some embodiments, the first preset termination condition comprises: the first primitive type set being an empty set, and a first primitive type set for the first knowledge transfer operation for this time being identical to a first primitive type set for the first knowledge transfer operation for last time. The apparatus further includes: a first adding unit (not shown in the figure), configured to: add, in response to ascertaining that the first preset termination condition is that the first primitive type set for the first knowledge transfer operation for this time is identical to the first primitive type set for the first knowledge transfer operation for last time, information representing a scene construction on a primitive type in the first primitive type set for the first knowledge transfer operation for this time to the final scene construction information based on a received input instruction.

In some embodiments, the color matching unit 903 is further configured to: perform, for each layer of scene composition image in a plurality of layers of scene composition images, following operations: performing a second knowledge transfer operation, until it is ascertained that a second preset termination condition is reached; ascertaining final color matching information corresponding to the layer of scene composition image according to target color matching information obtained through the second knowledge transfer operation for each time; and adjusting a color of each primitive in the layer of scene construction image according to the color matching information, to obtain a color matching image corresponding to the layer of scene construction image. Here, the second knowledge transfer operation includes: ascertaining a second target primitive type set corresponding to a second primitive type set based on a similarity; ascertaining color matching information corresponding to the second target primitive type set as target color matching information; and ascertaining a primitive type included in the second primitive type set but not included in the second target primitive type set as a second primitive type set for the second knowledge transfer operation for next time. Here, a second primitive type set for the second knowledge transfer operation for first time is a primitive type set corresponding to the layer of scene composition image.

In some embodiments, the second preset termination condition includes: the second primitive type set being an empty set, and a second primitive type set for the second knowledge transfer operation for this time being identical to a second primitive type set for the second knowledge transfer operation for last time. The apparatus further includes: a second adding unit (not shown in the figure), configured to: add, in response to ascertaining that the second preset termination condition is the second primitive type set for the second knowledge transfer operation for this time being identical to the second primitive type set for the second knowledge transfer operation for last time, information representing color matching on a primitive type in the second primitive type set for the second knowledge transfer operation for this time to the final color matching information based on a received input instruction.

In this embodiment, the composing unit in the apparatus for generating an image performs the image composition based on the acquired image generation condition, and ascertains the primitive type and layout information of the image to obtain the composition image. The scene constructing unit performs the scene construction on the composition image according to the scene construction information corresponding to the image generation condition, and ascertains the primitive corresponding to the each primitive type in the plurality of primitive types in the composition image to obtain the scene construction image. The color matching unit adjusts the color of the each primitive in the scene construction image according to the color matching information corresponding to the image generation condition to obtain the color matching image. The rendering unit renders the color matching image to obtain the target image. Therefore, the target image can be flexibly generated according to the image generation condition, thereby improving the flexibility in generating an image.

Figure 10:
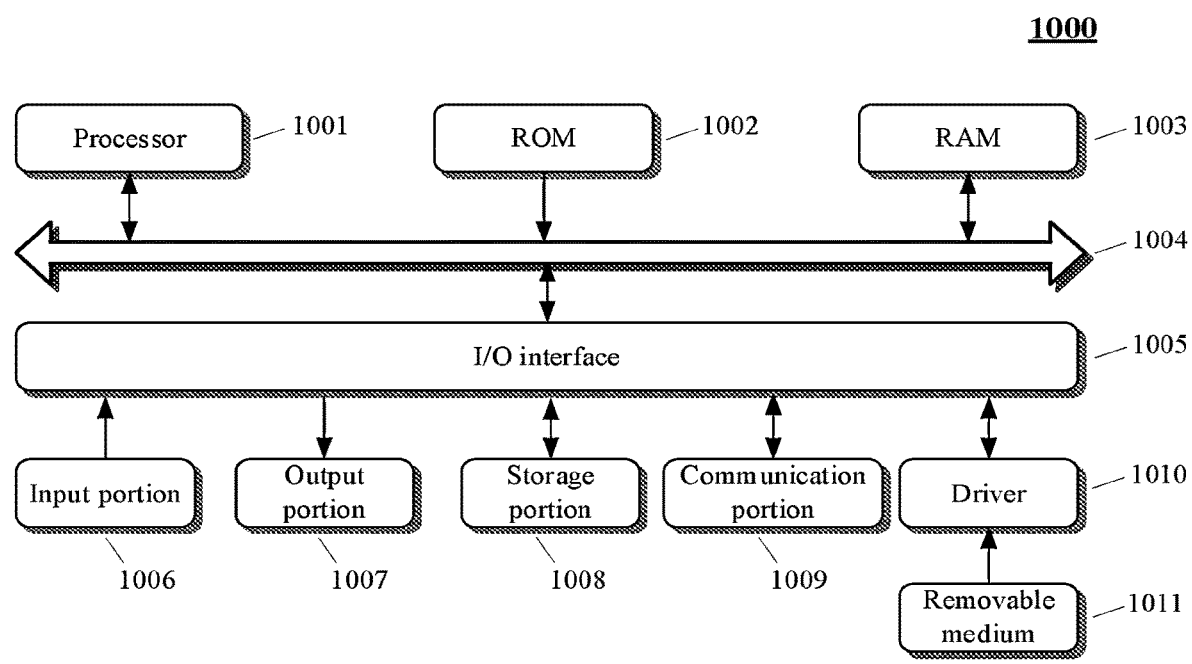
FIG. 10 is a schematic structural diagram of a computer system adapted to implement embodiments of the present disclosure.

Referring to FIG. 10, FIG. 10 is a schematic structural diagram of a computer system 1000 of a device (e.g., the devices 101, 102, 103 and 105 shown in FIG. 1) adapted to implement embodiments of the present disclosure. The device shown in FIG. 10 is merely an example, and should not bring any limitation to the functions and the scope of use of the embodiments of the present disclosure.

As shown in FIG. 10, the computer system 1000 includes a central processing unit (CPU) 1001, which may execute various appropriate actions and processes in accordance with a program stored in a read-only memory (ROM) 1002 or a program loaded into a random access memory (RAM) 1003 from a storage portion 1008. The RAM 1003 also stores various programs and data required by operations of the system 1000. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse, etc.; an output portion 1007 including such as a cathode ray tube (CRT), a liquid crystal display device (LCD), a speaker, etc.; a storage portion 1008 including a hard disk and the like; and a communication portion 1009 including a network interface card, such as a LAN card and a modem. The communication portion 1009 performs communication processes via a network, such as the Internet. A driver 1010 is also connected to the I/O interface 1005 as required. A removable medium 1011, such as a magnetic disk, an optical disk, a magneto-optical disk, and a semiconductor memory, may be installed on the driver 1010, to facilitate the retrieval of a computer program from the removable medium 1011, and the installation thereof on the storage portion 1008 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 1009, and/or may be installed from the removable medium 1011. The computer program, when executed by the central processing unit (CPU) 1001, implements the above-mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The described units involved in the embodiments of the present disclosure may be implemented by means of software or hardware. The described unit can alternatively be provided in a processor, which, for example, can be described as: a processor including a composing unit, a scene constructing unit, a color matching unit and a rendering unit. Here, the names of these units do not in some cases constitute a limitation to such units themselves. For example, the composing unit may alternatively be described as a unit for performing an image composition based on an acquired image generation condition, and ascertaining a primitive type and layout information of an image to obtain a composition image.

On the other hand, the present disclosure further provides a computer readable medium. The computer readable medium may be the computer readable medium included in the device described in the above embodiments, or a stand-alone computer readable medium not assembled into the device. The above computer readable medium carries one or more programs. The one or more programs, when executed by the device, cause the computer device to: perform an image composition based on an acquired image generation condition, and ascertain a primitive type and layout information of an image to obtain a composition image; perform a scene construction on the composition image according to scene construction information corresponding to the image generation condition, and ascertain a primitive corresponding to each primitive type in a plurality of primitive types in the composition image to obtain a scene construction image; adjust a color of each primitive in the scene construction image according to color matching information corresponding to the image generation condition to obtain a color matching image; and render the color matching image to obtain a target image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating an image, comprising:
performing an image composition based on an acquired image generation condition, and ascertaining a primitive type and layout information of an image to obtain a composition image, comprising performing, based on the acquired image generation condition, a multi-layer image composition from part to whole using a preset composition knowledge graph and ascertaining a primitive type and layout information in each layer of image to obtain a plurality of layers of composition images nested layer by layer and representing composition information of the layers, wherein the nested layer by layer is used to represent that, for each layer of composition image in the plurality of layers of composition images, the layer of composition image is nested with a lower layer of composition image that takes a part of primitive types in the layer of composition image as a whole;

performing a scene construction on the composition image according to scene construction information corresponding to the acquired image generation condition and ascertaining a primitive corresponding to each primitive type in a plurality of primitive types in the composition image to obtain a scene construction image;

adjusting a color of each primitive in the scene construction image according to color matching information corresponding to the acquired image generation condition to obtain a color matching image; and rendering the color matching image to obtain a target image.

2. The method according to claim 1, wherein performing, based on the acquired image generation condition, the multi-layer image composition from part to whole using the preset composition knowledge graph and ascertaining the primitive type and layout information in each layer of the image to obtain the plurality of layers of composition images nested layer by layer and representing composition information of the layers comprises:

performing, for the each layer of composition image in the plurality of layers of composition images, following operations:

ascertaining, for each composition parameter in a plurality of composition parameters ascertained based on the acquired image generation condition and the preset composition knowledge graph, a parameter value of the composition parameter through determination information corresponding to the composition parameter in a composition process of the layer of composition image, wherein the composition parameter comprises an operation parameter for each primitive type in the layer of composition image and a call parameter for the lower layer of composition image; and obtaining the layer of composition image based on each parameter value.

3. The method according to claim 2, wherein, for the layer of composition image, parameter values ascertained by a given composition parameter are different, and the layer of composition image comprises a plurality of sub-composition images having identical primitive types and different layouts, and obtaining the layer of composition image based on each parameter value comprises:

performing, for each composition parameter in the plurality of composition parameters in the composition process of the layer of composition image, a nested call on a parameter value of a composition parameter having a previously ascertained parameter value, to ascertain a plurality of sets of parameter value groups comprising parameter values of the plurality of composition parameters; and obtaining the plurality of sub-composition images having the identical primitive types and the different layouts and corresponding to the layer of composition image, based on the plurality of sets of parameter value groups.

4. The method according to claim 3, further comprising:

ascertaining, in response to ascertaining that a selection instruction is received, at least one sub-composition image of the layer of composition image on which an upper layer of composition image of the layer of composition image is to perform a nested call, based on the selection instruction.

5. The method according to claim 1, wherein performing the scene construction on the composition image according to the scene construction information corresponding to the acquired image generation condition and ascertaining a primitive corresponding to each primitive type in the plurality of primitive types in the composition image to obtain the scene construction image comprises:

performing, for each layer of composition image in the plurality of layers of composition images, following operations:

performing a first knowledge transfer operation, until it is ascertained that a first preset termination condition is reached;

ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image, wherein the first knowledge transfer operation comprises: ascertaining a first target primitive type set corresponding to a first primitive type set based on a similarity; ascertaining scene construction information corresponding to the first target primitive type set as the target scene construction information; and ascertaining a primitive type included in the first primitive type set but not included in the first target primitive type set as a first primitive type set for the first knowledge transfer operation for next time, wherein a first primitive type set for the first knowledge transfer operation for first time is a primitive type set corresponding to the layer of composition image.

6. The method according to claim 5, wherein ascertaining the primitive corresponding to each primitive type in the plurality of primitive types in the layer of composition image to obtain the scene construction image corresponding to the layer of composition image comprises:

ascertaining, from a primitive library, the primitive corresponding to the each primitive type in the plurality of primitive types in the layer of composition image according to a pre-established search tree representing a relationship between a primitive type and a primitive, to obtain the scene construction image corresponding to the layer of composition image.

7. The method according to claim 5, wherein the first preset termination condition comprises: the first primitive type set being an empty set, and a first primitive type set for the first knowledge transfer operation for this time being identical to a first primitive type set for the first knowledge transfer operation for last time, and the method further comprises:

adding, in response to ascertaining that the first preset termination condition is that the first primitive type set for the first knowledge transfer operation for this time is identical to the first primitive type set for the first knowledge transfer operation for last time, information representing a scene construction on a primitive type in the first primitive type set for the first knowledge transfer operation for this time to the final scene construction information based on a received input instruction.

8. The method according to claim 5, wherein adjusting the color of each primitive in the scene construction image according to the color matching information corresponding to the acquired image generation condition to obtain the color matching image comprises:

performing, for each layer of scene composition image in a plurality of layers of scene composition images, following operations:

performing a second knowledge transfer operation, until it is ascertained that a second preset termination condition is reached;

ascertaining final color matching information corresponding to the layer of scene composition image according to target color matching information obtained through the second knowledge transfer operation for each time; and adjusting a color of each primitive in the layer of scene construction image according to the color matching information, to obtain a color matching image corresponding to the layer of scene construction image, wherein the second knowledge transfer operation comprises: ascertaining a second target primitive type set corresponding to a second primitive type set based on a similarity; ascertaining color matching information corresponding to the second target primitive type set as target color matching information; and ascertaining a primitive type included in the second primitive type set but not included in the second target primitive type set as a second primitive type set for the second knowledge transfer operation for next time, wherein a second primitive type set for the second knowledge transfer operation for first time is a primitive type set corresponding to the layer of scene composition image.

9. The method according to claim 8, wherein the second preset termination condition comprises: the second primitive type set being an empty set, and a second primitive type set for the second knowledge transfer operation for this time being identical to a second primitive type set for the second knowledge transfer operation for last time, and the method further comprises:

adding, in response to ascertaining that the second preset termination condition is that the second primitive type set for the second knowledge transfer operation for this time is identical to the second primitive type set for the second knowledge transfer operation for last time, information representing color matching on a primitive type in the second primitive type set for the second knowledge transfer operation for this time to the final color matching information based on a received input instruction.

10. An apparatus for generating an image, comprising:
one or more processors; and
a memory storing one or more computer instructions,
wherein the one or more computer instructions, when executed by the one or more processors, cause the one or more processors to perform operations, the operations comprising:

performing an image composition based on an acquired image generation condition, and ascertaining a primitive type and layout information of an image to obtain a composition image, comprising performing, based on the acquired image generation condition, a multi-layer image composition from part to whole using a preset composition knowledge graph and ascertaining a primitive type and layout information in each layer of image to obtain a plurality of layers of composition images nested layer by layer and representing composition information of the layers, wherein the nested layer by layer is used to represent that, for each layer of composition image in the plurality of layers of composition images, the layer of composition image is nested with a lower layer of composition image that takes a part of primitive types in the layer of composition image as a whole;

performing a scene construction on the composition image according to scene construction information corresponding to the acquired image generation condition, and ascertaining a primitive corresponding to each primitive type in a plurality of primitive types in the composition image to obtain a scene construction image;

adjusting a color of each primitive in the scene construction image according to color matching information corresponding to the acquired image generation condition to obtain a color matching image; and rendering the color matching image to obtain a target image.

11. The apparatus according to claim 10, wherein performing, based on the acquired image generation condition, the multi-layer image composition from part to whole using the preset composition knowledge graph and ascertaining the primitive type and layout information in each layer of the image to obtain the plurality of layers of composition images nested layer by layer and representing composition information of the layers comprises:

performing, for the each layer of composition image in the plurality of layers of composition images, following operations: ascertaining, for each composition parameter in a plurality of composition parameters ascertained based on the acquired image generation condition and the preset composition knowledge graph, a parameter value of the composition parameter through determination information corresponding to the composition parameter in a composition process of the layer of composition image, wherein the composition parameter comprises an operation parameter for each primitive type in the layer of composition image and a call parameter for the lower layer of composition image; and obtaining the layer of composition image based on each parameter value.

12. The apparatus according to claim 11, wherein, for the layer of composition image, parameter values ascertained by a given composition parameter are different, and the layer of composition image comprises a plurality of sub-composition images having identical primitive types and different layouts, and obtaining the layer of composition image based on each parameter value comprises: performing, for each composition parameter in the plurality of composition parameters in the composition process of the layer of composition image, a nested call on a parameter value of a composition parameter having a previously ascertained parameter value, to ascertain a plurality of sets of parameter value groups comprising parameter values of the plurality of composition parameters; and obtaining the plurality of sub-composition images having the identical primitive types and the different layouts and corresponding to the layer of composition image, based on the plurality of sets of parameter value groups.

13. The apparatus according to claim 12, wherein the operations further comprise:
ascertaining, in response to ascertaining that a selection instruction is received, at least one sub-composition image of the layer of composition image on which an upper layer of composition image of the layer of composition image is to perform a nested call, based on the selection instruction.

14. The apparatus according to claim 10, wherein performing the scene construction on the composition image according to the scene construction information corresponding to the acquired image generation condition and ascertaining the primitive corresponding to each primitive type in the plurality of primitive types in the composition image to obtain the scene construction image comprises:
performing, for the each layer of composition image in the plurality of layers of composition images, following operations: performing a first knowledge transfer operation, until it is ascertained that a first preset termination condition is reached; ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image, wherein the first knowledge transfer operation comprises: ascertaining a first target primitive type set corresponding to a first primitive type set based on a similarity; ascertaining scene construction information corresponding to the first target primitive type set as target scene construction information; and ascertaining a primitive type included in the first primitive type set but not included in the first target primitive type set as a first primitive type set for the first knowledge transfer operation for next time, wherein a first primitive type set for the first knowledge transfer operation for first time is a primitive type set corresponding to the layer of composition image.

15. The apparatus according to claim 14, wherein ascertaining the primitive corresponding to each primitive type in the plurality of primitive types in the layer of composition image to obtain the scene construction image corresponding to the layer of composition image comprises:
ascertaining, from a primitive library, the primitive corresponding to the each primitive type in the plurality of primitive types in the layer of composition image according to a pre-established search tree representing a relationship between a primitive type and a primitive, to obtain the scene construction image corresponding to the layer of composition image.

16. The apparatus according to claim 14, wherein the first preset termination condition comprises: the first primitive type set being an empty set, and a first primitive type set for the first knowledge transfer operation for this time being identical to a first primitive type set for the first knowledge transfer operation for last time, and
the operations further comprise: adding, in response to ascertaining that the first preset termination condition is that the first primitive type set for the first knowledge transfer operation for this time is identical to the first primitive type set for the first knowledge transfer operation for last time, information representing a scene construction on a primitive type in the first primitive type set for the first knowledge transfer operation for this time to the final scene construction information based on a received input instruction.

17. The apparatus according to claim 14, wherein adjusting the color of each primitive in the scene construction image according to the color matching information corresponding to the acquired image generation condition to obtain the color matching image comprises:
performing, for each layer of scene composition image in a plurality of layers of scene composition images, following operations: performing a second knowledge transfer operation, until it is ascertained that a second preset termination condition is reached; ascertaining final color matching information corresponding to the layer of scene composition image according to target color matching information obtained through the second knowledge transfer operation for each time; and adjusting a color of each primitive in the layer of scene construction image according to the color matching information, to obtain a color matching image corresponding to the layer of scene construction image, wherein the second knowledge transfer operation comprises: ascertaining a second target primitive type set corresponding to a second primitive type set based on a similarity; ascertaining color matching information corresponding to the second target primitive type set as target color matching information; and ascertaining a primitive type included in the second primitive type set but not included in the second target primitive type set as a second primitive type set for the second knowledge transfer operation for next time, wherein a second primitive type set for the second knowledge transfer operation for first time is a primitive type set corresponding to the layer of scene composition image.

18. The apparatus according to claim 17, wherein the second preset termination condition comprises: the second primitive type set being an empty set, and a second primitive type set for the second knowledge transfer operation for this time being identical to a second primitive type set for the second knowledge transfer operation for last time, and
the operations further comprise: adding, in response to ascertaining that the second preset termination condition is that the second primitive type set for the second knowledge transfer operation for this time is identical to the second primitive type set for the second knowledge transfer operation for last time, information representing color matching on a primitive type in the second primitive type set for the second knowledge transfer operation for this time to the final color matching information based on a received input instruction.

19. A non-transitory computer readable medium, storing a computer program, wherein the computer program, when executed by a processor, causes the processor to perform operations, the operations comprising:

performing an image composition based on an acquired image generation condition, and ascertaining a primitive type and layout information of an image to obtain a composition image, comprising performing, based on the acquired image generation condition, a multi-layer image composition from part to whole using a preset composition knowledge graph and ascertaining a primitive type and layout information in each layer of image to obtain a plurality of layers of composition images nested layer by layer and representing composition information of the layers, wherein the nested layer by layer is used to represent that, for each layer of composition image in the plurality of layers of composition images, the layer of composition image is nested with a lower layer of composition image that takes a part of primitive types in the layer of composition image as a whole;

performing a scene construction on the composition image according to scene construction information corresponding to the acquired image generation condition and ascertaining a primitive corresponding to each primitive type in a plurality of primitive types in the composition image to obtain a scene construction image;

adjusting a color of each primitive in the scene construction image according to color matching information corresponding to the acquired image generation condition to obtain a color matching image; and rendering the color matching image to obtain a target image.

20. The non-transitory computer readable medium according to claim 19, wherein performing, based on the acquired image generation condition, the multi-layer image composition from part to whole using the preset composition knowledge graph and ascertaining the primitive type and layout information in each layer of the image to obtain a plurality of layers of composition images nested layer by layer and representing composition information of the layers comprises:

performing, for the each layer of composition image in the plurality of layers of composition images, following operations:

ascertaining, for each composition parameter in a plurality of composition parameters ascertained based on the acquired image generation condition and the preset composition knowledge graph, a parameter value of the composition parameter through determination information corresponding to the composition parameter in a composition process of the layer of composition image, wherein the composition parameter comprises an operation parameter for each primitive type in the layer of composition image and a call parameter for the lower layer of composition image; and obtaining the layer of composition image based on each parameter value;

wherein for the layer of composition image, parameter values ascertained by a given composition parameter are different, and the layer of composition image comprises a plurality of sub-composition images having identical primitive types and different layouts, and the obtaining the layer of composition image based on each parameter value comprises:

performing, for each composition parameter in the plurality of composition parameters in the composition process of the layer of composition image, a nested call on a parameter value of a composition parameter having a previously ascertained parameter value, to ascertain a plurality of sets of parameter value groups comprising parameter values of the plurality of composition parameters; and obtaining the plurality of sub-composition images having the identical primitive types and the different layouts and corresponding to the layer of composition image, based on the plurality of sets of parameter value groups; and wherein the operations further comprise:

ascertaining, in response to ascertaining that a selection instruction is received, at least one sub-composition image of the layer of composition image on which an upper layer of composition image of the layer of composition image is to perform a nested call, based on the selection instruction.

21. The non-transitory computer readable medium according to claim 19, wherein performing the scene construction on the composition image according to the scene construction information corresponding to the acquired image generation condition and ascertaining the primitive corresponding to each primitive type in the plurality of primitive types in the composition image to obtain the scene construction image comprises:

performing, for the each layer of composition image in the plurality of layers of composition images, following operations:

performing a first knowledge transfer operation, until it is ascertained that a first preset termination condition is reached;

ascertaining final scene construction information corresponding to the layer of composition image according to target scene construction information obtained through the first knowledge transfer operation for each time; and performing a scene construction on the layer of composition image according to the final scene construction information, and ascertaining a primitive corresponding to each primitive type in a plurality of primitive types in the layer of composition image to obtain a scene construction image corresponding to the layer of composition image, wherein the first knowledge transfer operation comprises: ascertaining a first target primitive type set corresponding to a first primitive type set based on a similarity; ascertaining scene construction information corresponding to the first target primitive type set as the target scene construction information; and ascertaining a primitive type included in the first primitive type set but not included in the first target primitive type set as a first primitive type set for the first knowledge transfer operation for next time, wherein a first primitive type set for the first knowledge transfer operation for first time is a primitive type set corresponding to the layer of composition image.

* * * * *